US008800972B2

(12) United States Patent
Sugimoto et al.

(10) Patent No.: US 8,800,972 B2
(45) Date of Patent: Aug. 12, 2014

(54) VIBRATION INSULATION DAMPER FOR COIL SPRING

(75) Inventors: Yoshikiyo Sugimoto, Tochigi (JP); Yoshiya Nakashima, Tochigi (JP); Fumikage Yamanaka, Wako (JP); Hidemasa Shukuri, Wako (JP)

(73) Assignees: F-Tech Inc., Kuki, Saitama (JP); Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 13/126,610

(22) PCT Filed: Oct. 29, 2009

(86) PCT No.: PCT/JP2009/005728
§ 371 (c)(1),
(2), (4) Date: Apr. 28, 2011

(87) PCT Pub. No.: WO2010/052014
PCT Pub. Date: May 6, 2010

(65) Prior Publication Data
US 2011/0210487 A1 Sep. 1, 2011

(30) Foreign Application Priority Data

Oct. 31, 2008 (JP) ................................. 2008-282589

(51) Int. Cl.
*B60G 11/52* (2006.01)
(52) U.S. Cl.
USPC ................ 267/33; 267/287; 267/74; 267/169
(58) Field of Classification Search
USPC ................. 267/139, 140, 140.11, 141, 141.3, 267/141.7, 169, 166, 33, 153, 174, 90, 202, 267/286, 287, 292, 74, 134, 135
See application file for complete search history.

(56) References Cited

U.S. PATENT DOCUMENTS 3,141,660 A 7/1964 Clarke et al.
3,489,403 A * 1/1970 Kieffer .......................... 267/287
(Continued)

FOREIGN PATENT DOCUMENTS

CN 1429321 A 7/2003
JP 51-65149 U 11/1949
(Continued)

OTHER PUBLICATIONS

Japanese Office Action dated Oct. 24, 2012, issued in corresponding Japanese Patent Application No. 2010-535677, (6 pages). With English Translation.

(Continued)

*Primary Examiner* — Thomas Irvin
(74) *Attorney, Agent, or Firm* — Westerman, Hattori, Daniels & Adrian, LLP

(57) ABSTRACT

A vibration insulation damper (10, 50, 60) insertable into an internal circumferential portion of a coil spring (20) and extending in an axial direction thereof, the vibration insulation damper is provided with an elastic body (14a, 14b, 64a, 64b) having a conical or pyramid outer circumferential surface formed so as to be shortened in distance with respect to the axial direction toward an end portion thereof in the axial direction, and a rib (16a, 16b, 16c, 16d, 16e, 16f, 56a, 56b, 56c, 56d, 56e, 56f) protruding outward from the outer circumferential surface of the elastic body to be brought into pressured contact with the internal circumferential portion of the coil spring when the elastic body is inserted into the internal circumferential portion of the coil spring.

6 Claims, 9 Drawing Sheets

(56) References Cited

U.S. PATENT DOCUMENTS

| | | |
|---|---|---|
| 3,861,661 A | 1/1975 | Yazaki |
| 4,874,154 A | 10/1989 | Zimbone |
| 5,180,146 A * | 1/1993 | Schneider et al. ......... 267/64.27 |
| 5,421,565 A * | 6/1995 | Harkrader et al. ............ 267/220 |

FOREIGN PATENT DOCUMENTS

| | | |
|---|---|---|
| JP | 57-172873 U | 4/1956 |
| JP | 58-36643 U | 9/1956 |
| JP | 50-040997 Y1 | 4/1975 |
| JP | 63-318332 A | 12/1988 |
| JP | 3-067728 U | 7/1991 |
| JP | 4-165131 A | 6/1992 |
| JP | 4-171327 A | 6/1992 |
| JP | 07-208544 A | 8/1995 |
| WO | 01/88404 A1 | 11/2001 |

OTHER PUBLICATIONS

Chinese Office Action dated Sep. 7, 2012, issued in corresponding Chinese patent application 200980141662.8, w/ English translation.
International Search Report of PCT/JP2009/005728, mailing date Dec. 8, 2009.

* cited by examiner

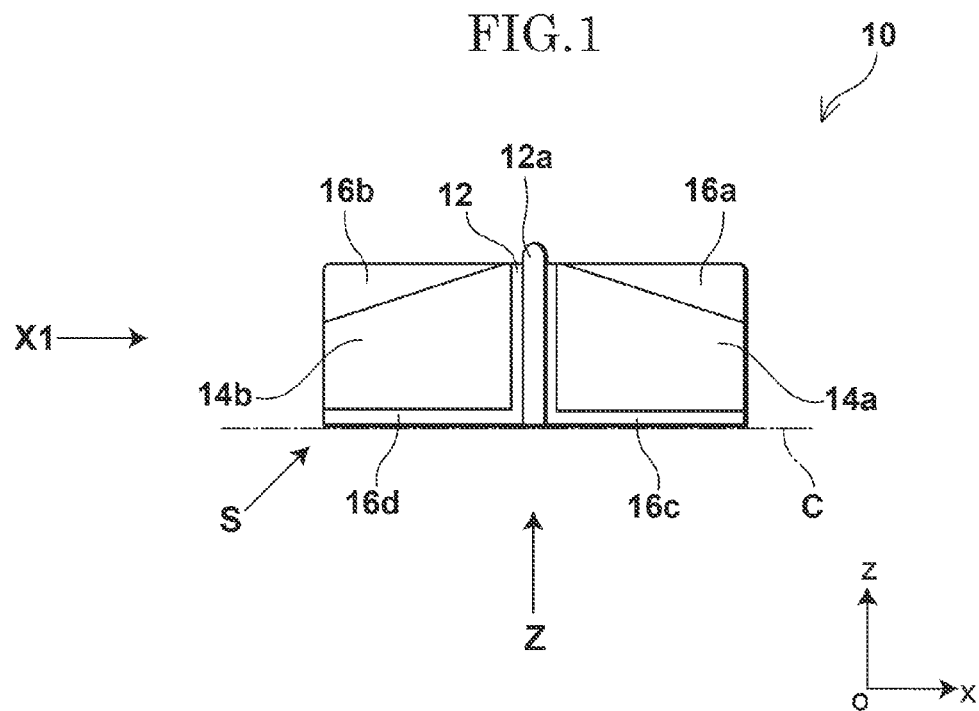
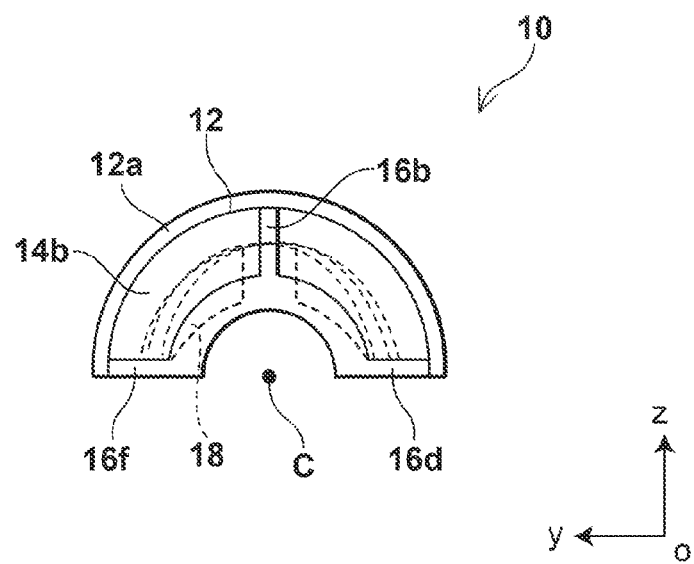

VIBRATION INSULATION DAMPER FOR COIL SPRING

TECHNICAL FIELD

The present invention relates to a vibration insulation damper and, more particularly, to a vibration insulation damper fittable to a coil spring used for a pedal apparatus of a vehicle.

BACKGROUND ART

A pedal apparatus, such as a brake pedal apparatus, of a vehicle like an automotive vehicle, is provided with a coil spring configured to generate a predetermined compressive force or tensile force depending on a depressing force or a stroke position of a pedal applied by a driver so as to adjust the depressing force applied by the driver. Although the coil spring is used in a compressive direction or a tensile direction, it is considered that both in use of compression or tension, adjacent segments of wire, wound to form the coil spring, are brought into contact with each other with resultant generation of noises.

With a view to eliminating such noises occurring in use of compression or tension of such a coil spring, a structure has been proposed to add an elastic body, such as a rubber material, to the coil spring. In particular, a structure has been proposed to fit the elastic body, such as a cylindrical rubber member, onto an external circumferential portion or into an internal circumferential portion of the coil spring.

For a structure of fitting the elastic body into the internal circumferential portion of the coil spring, a structure has been proposed to insert a rubber member, having a cylindrical shape a part of which is partially depressed, or a semi-cylindrical rubber member into the coil spring along the internal circumferential portion thereof (see Patent Literatures 1 to 3).

PRIOR ART LITERATURES

Patent Literatures

Patent Literature 1: Japanese Patent Application Laid-Open Publication No. H4-165131
Patent Literature 2: Japanese Patent Application Laid-Open Publication No. H4-171327
Patent Literature 3: Japanese Utility Model Application Laid-Open Publication No. H3-67728

SUMMARY OF INVENTION

Problem to be Solved by the Invention

Upon studies conducted by the present inventors, however, with the structures proposed in Patent Literature 1 to 3, there is a case in which the rubber member, having the cylindrical shape a part of which is depressed, is applied. In this case, the rubber member has a large contact area with respect to the internal circumferential portion of the coil spring. Thus, it is not easy for the rubber member to be immediately and accurately assembled to the coil spring while having a tendency to be difficult for the rubber member to adjust anti-vibration characteristics in a view of shape.

Further, in case that such a rubber member, having the large contact area with respect to the coil spring, is press fitted into the coil spring, since the rubber member is likely to be hardened due to a temporal change thereof, the rubber member is likely to be fixed in shape with respect to the internal circumferential portion of the coil spring with a resultant tendency of causing undesired sliding noises to occur between the coil spring and the elastic body during a compressive motion or a tensile motion of the coil spring.

Even when using the semi-cylindrical rubber member, further, it is not easy to decrease the contact area with respect to the coil spring while maintaining the pressing force to the coil spring enough with no cause of its drop-off from the coil spring, and also, there is a tendency to be difficult to adjust anti-vibration characteristics of the rubber member in a view of shape. In addition, when inserting the semi-cylindrical rubber member into the coil spring along the internal circumferential portion thereof, the rubber member is subjected to kinking or twisting motion with a resultant difficulty caused in assembly keeping a regular attitude of such a rubber member.

With the structure in which the cylindrical elastic member is fitted onto the external circumferential portion of the coil spring, meanwhile, the cylindrical elastic member needs to be brought into tight contact with an entire portion of an outer circumference of the coil spring in order to prevent the elastic body from dropping off and, hence, it is often difficult to assemble such an elastic member onto the coil spring with swiftness and accuracy.

The present invention has been accomplished through the above studies and has an object to provide a vibration insulation damper for a coil spring which can be accurately positioned while decreasing a contact area of the vibration insulation damper with no occurrence of kinking or twisting motion thereof, when the vibration insulation damper is fitted into the coil spring along an internal circumferential portion thereof, and also assembled with no occurrence of its drop-off to provide desired anti-vibration characteristics while suppressing the occurrence of noises even if, for instance, a rubber member is hardened due to a temporal change thereof.

Means for Solving the Problem

To achieve the above object, according to one aspect of the present invention, a vibration insulation damper, insertable into an internal circumferential portion of a coil spring and extending in an axial direction thereof, comprises an elastic body having a conical or pyramid outer circumferential surface formed so as to be shortened in distance with respect to the axial direction toward an end portion thereof in the axial direction; and a rib protruding outward from the outer circumferential surface of the elastic body to be brought into pressured contact with the internal circumferential portion of the coil spring when the elastic body is inserted into the internal circumferential portion of the coil spring.

In addition to the first aspect, the vibration insulation damper of the present invention has a second aspect wherein the elastic body is provided with a first extending portion formed in a conical or pyramid outer circumferential surface so as to be shortened in distance with respect to the axial direction toward an end portion thereof in a first direction of the axial direction, and a second extending portion having a conical or pyramid outer circumferential surface formed so as to be shortened in distance with respect to the axial direction toward an end portion thereof in a second direction in opposition to the first direction of the axial direction to be integrally connected to the first extending portion via a central portion of the elastic body, wherein the rib is provided to protrude outward each from the outer circumferential surface of the first extending portion and the outer circumferential surface of the second extending portion, and wherein the first extending portion and the second extending portion are symmetric with respect to the central portion and the rib, provided to the first extending portion and the second extending portion, is symmetric with respect to the central portion.

In addition to the first or second aspects, the vibration insulation damper of the present invention has a third aspect wherein the elastic body is configured to be split in the axial direction to form a split body having an inner circumferential surface.

In addition to any one of the first to the third aspects, the vibration insulation damper of the present invention has a fourth aspect wherein the rib is provided with at least one of a central rib extending over an entire length of the first extending portion and the second extending portion in the axial direction while protruding outward from each outer circumferential surface of the first extending portion and the second extending portion in a direction perpendicular to the axial direction, at a center of each outer circumferential surface of the first extending portion and the second extending portion in a direction perpendicular to the axial direction, and a side rib extending over an entire length of the first extending portion and the second extending portion in the axial direction while protruding outward from each outer circumferential surface of the first extending portion and the second extending portion in the direction perpendicular to the axial direction, at a side end of each outer circumferential surface of the first extending portion and the second extending portion in a direction perpendicular to the axial direction.

In addition to any one of the first to fourth aspects, the vibration insulation damper of the present invention has a fifth aspect wherein a width of the rib in a direction perpendicular to the axial direction is tapered toward an outside of the elastic body.

In addition to any one of the first to fifth aspects, the vibration insulation damper of the present invention has a sixth aspect wherein the elastic body is further provided with a protruding portion protruding outward from the outer circumferential surface of the elastic body over an entire circumferential length of the outer circumferential surface, such that the protruding portion is be fitted between wire segments of the coil spring with the elastic body being inserted into the internal circumferential portion of the coil spring.

In addition to any one of the first to sixth aspects, the vibration insulation damper of the present invention has a seventh aspect wherein the elastic body is further provided with a rib protruding inward from an inner circumferential surface of the elastic body and radially extending in the inner circumferential surface.

Advantageous Effects of the Invention

According to the structure of the first aspect of the present invention, the elastic body is provided with the ribs that protrude outward from the conical or pyramid outer circumferential surface of the elastic body to be brought into pressured contact with the internal circumferential portion of the coil spring when the elastic body is inserted into the internal circumferential portion of the coil spring. Thus, when the vibration insulation damper is actually inserted into the coil spring along the internal circumferential portion thereof, the vibration insulation damper can be accurately positioned to the coil spring with no occurrence of kinking or twisting motion thereof and resultantly assembled with no occurrence of its drop-off while decreasing the contact area of the vibration insulation damper with respect to the internal circumferential portion of the coil spring such that desired anti-vibration characteristics can be obtained. Further, since the contact area of the vibration insulation damper with respect to the internal circumferential portion of the coil spring can be reduced, resistance occurring during stretching and compressing of the coil spring can be reduced. Thus, even if the elastic body is hardened due to temporal change or the like, sliding noises between the coil spring and the elastic body can be suppressed. Furthermore, at the initial stage in which the vibration insulation damper is inserted into the coil spring, the vibration insulation damper is going to be press fitted from one end side of the elastic body, and the rib, formed thereon, has rigidity that can be relatively set to be low. Thus, this can causes the rib to deform and enables the reduction in insertion resistance of the vibration insulation damper with respect to the internal circumferential portion of the coil spring to allow the vibration insulation damper to be simply and surely inserted into the coil spring, thereby resulting in improved assembling capability.

According to the structure of the second aspect of the present invention, further, the first extending portion and the second extending portion, forming the elastic body, are integrally connected to each other via the central portion to be symmetric with respect to the central portion while the ribs, formed on the first extending portion and the second extending portion, respectively, are symmetric with respect to the central portion. This enables similar assembly to be performed even if the vibration insulation damper is inserted into the internal circumferential portion of the coil spring at either the first extending portion or the second extending portion, thereby further improving capability of assembling the vibration insulation damper into the coil spring. In addition, the central portion is able to apply the internal circumferential portion of the coil spring with the relatively large pressing force, thereby making it possible to obtain stable anti-vibration characteristics.

According to the structure of the third aspect of the present invention, furthermore, the elastic body is comprised of the split body having the inner circumferential surface. Thus, pressing the elastic body by grasping the same enables the elastic body to be inserted into the internal circumferential portion of the coil spring under the compressed state thereof so as to bend inward from the inner circumferential surface. This makes it easy to perform such insertion of the elastic body with resultant further improved capability of assembling the vibration insulation damper into the coil spring. Moreover, after the vibration insulation damper has been assembled into the coil spring, the elastic body expands outward to apply the internal circumferential portion of the coil spring with the stable pressing force, thereby making it possible to obtain stable anti-vibration characteristics.

Besides, the structure of the fourth aspect of the present invention, there is provided at least one of the central rib, extending over the entire length of the first extending portion and the second extending portion in each axial direction and the center of each outer circumferential surface of the first extending portion and the second extending portion in the direction perpendicular to the axial direction, and the side rib extending over the entire length of the first extending portion and the second extending portion in the axial direction at the side end of each outer circumferential surface of the first extending portion and the second extending portion in the direction perpendicular to the axial direction. This allows the rib to apply the internal circumferential portion of the coil spring with the pressing force in the balanced manner, thereby making it possible to obtain stable anti-vibration characteristics.

According to the structure of the fifth aspect of the present invention, further, the width of the rib in the direction perpendicular to the axial direction is tapered outward the elastic body. This can ensure rigidity of the rib while decreasing the contact area of the elastic body with respect to the internal circumferential portion of the coil spring when the vibration insulation damper is inserted into the coil spring along the internal circumferential portion thereof, thereby further ensuring the pressing force for the internal circumferential portion of the coil spring to obtain stable anti-vibration characteristics.

According to the structure of the sixth aspect of the present invention, furthermore, the elastic body further includes the protruding portion protruding outward from the outer circumferential surface of the elastic body over the entire circumferential length thereof and the protruding portion can be fitted between the wire segments of the coil spring with the elastic body being inserted into the internal circumferential portion of the coil spring. Thus, when the vibration insulation damper is actually inserted into the coil spring along the internal circumferential portion thereof, the vibration insulation damper can be accurately positioned to the coil spring with no occurrence of kinking or twisting motion thereof to be assembled with no occurrence of its drop-off such that stable anti-vibration characteristics can be obtained.

According to the structure of the seventh aspect of the present invention, the elastic body further includes the rib protruding inward from the inner circumferential surface of the elastic body and radially extending along the inner circumferential surface thereof. Thus, when the vibration insulation damper is actually inserted into the coil spring along the internal circumferential portion thereof, the vibration insulation damper can be accurately positioned to the coil spring with no occurrence of kinking or twisting motion thereof with no occurrence of its drop-off such that stable anti-vibration characteristics can be obtained. Moreover, after the vibration insulation damper has been assembled into the coil spring, the elastic body can be kept under the expanded state to apply the internal circumferential portion of the coil spring with the stable pressing force, thereby making it possible to reliably obtain stable anti-vibration characteristics.

BRIEF DESCRIPTION OF THE DRAWINGS

FIG. 1 is a side view of a vibration insulation damper of a first embodiment according to the present invention.

FIG. 2 is a front view of the vibration insulation damper of the present embodiment and represents a view taken on arrow X1 in FIG. 1.

BEST MODE FOR CARRYING OUT THE INVENTION

Now, vibration insulation dampers of various embodiments according to the present invention will be described below in detail with suitable reference to the accompanying drawings. Throughout the drawings, an x-axis, a y-axis and a z-axis form a three-axis orthogonal coordinate system.

(First Embodiment)

First, a vibration insulation damper of a first embodiment according to the present invention will be described below in detail with reference to FIGS. 1 to 4.

Figure 3:
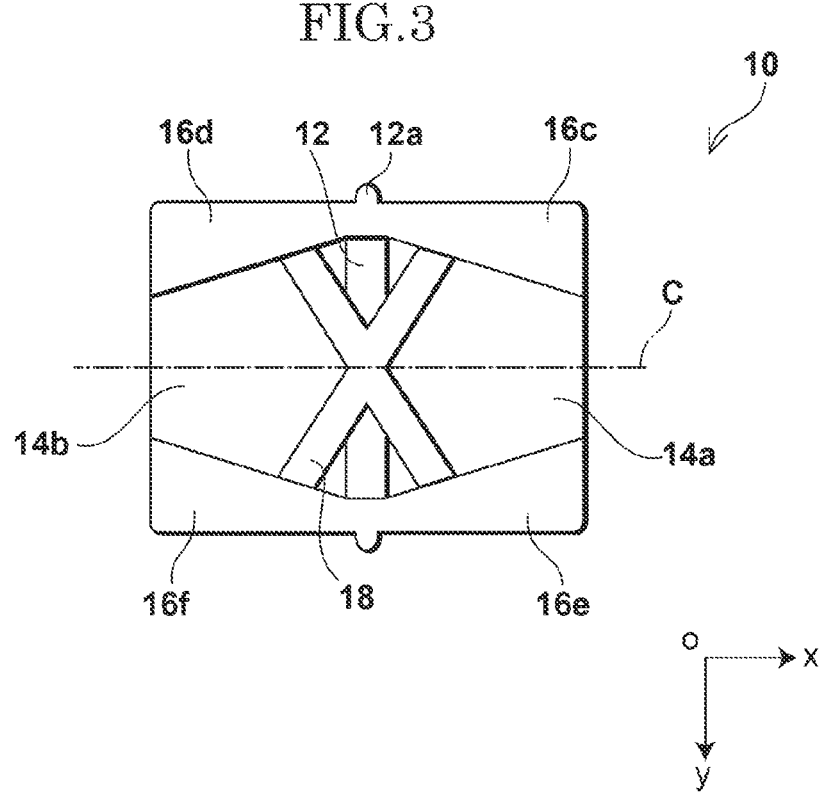
FIG. 3 is a bottom view of the vibration insulation damper of the present embodiment and represents a view taken on arrow Z in FIG. 1.
Figure 4:
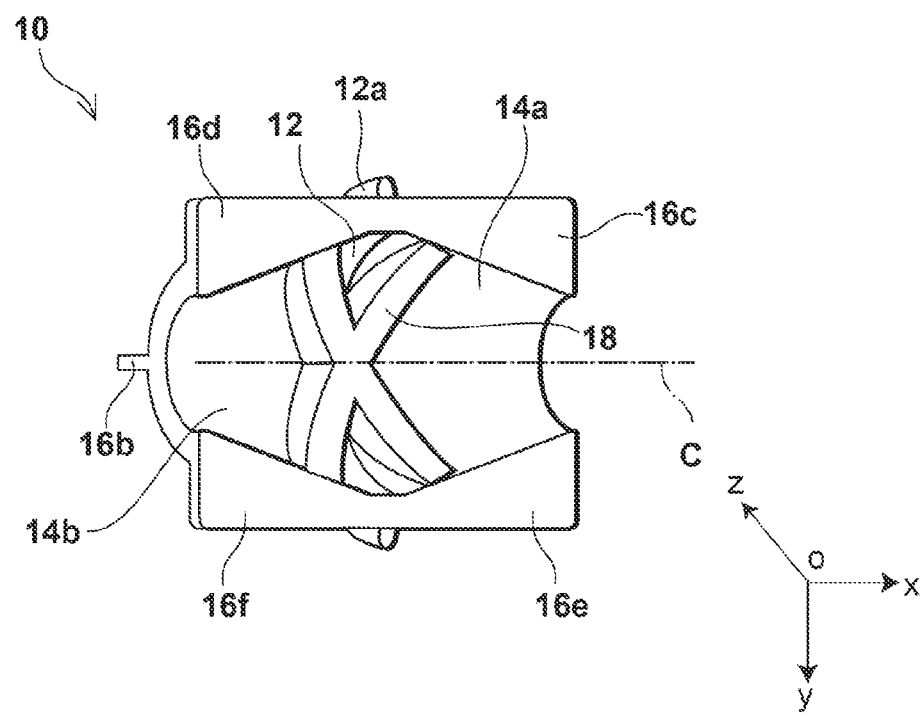
FIG. 4 is a bottom perspective view of the vibration insulation damper of the present embodiment and represents a view taken on arrow S in FIG. 1.

FIG. 1 is a side view of the vibration insulation damper of the present embodiment. FIG. 2 is a front view of the vibration insulation damper of the present embodiment and represents a view taken on arrow X1 of FIG. 1. FIG. 3 is a bottom view of the vibration insulation damper of the present embodiment and represents a view taken on arrow Z of FIG. 1. In addition, FIG. 4 is a bottom perspective view of the vibration insulation damper of the present embodiment and represents a view taken on arrow S of FIG. 1.

As shown in FIGS. 1 to 4, the vibration insulation damper 10 is a cylindrical member extending along an axis C parallel to the x-axis and having a circumferential wall portion partly split to be opened in a negative direction of the z-axis. Here, the vibration insulation damper 10 includes a central portion 12, a first extending portion 14a and a second extending portion 14b, integrally contiguous therewith via the central portion 12, all of which are coaxial with the axis C. In addition, the vibration insulation damper 10 is made of an elastic body, such as a rubber member, etc., which can be preferably made of thermoplastic elastomer (TPE), such as thermoplastic olefin (TPO) and the like. The central portion 12, the first extending portion 14a and the second extending portion 14b may be unitarily formed by using a molding die.

More particularly, the vibration insulation damper 10 includes the central portion 12 in the form of a semi-cylindrical member obtained by splitting a cylindrical member, which has a cylindrical wall-like outer surface with a center axis aligned on the axis C, into halves with a cutting plane cut along a direction of the axis C, viz., a cutting plane involving the axis C and parallel to the x-y plane, in such a manner that a part of a circumferential wall portion of the cylindrical member is opened to expose an inner circumferential surface thereof in the negative direction of the z-axis. The central portion 12 has the outer circumferential surface from which a protruding portion 12a protrudes outward in a radial direction of the central portion 12 to straddle over an entire circumference of the outer circumferential surface of the central portion 12. The protruding portion 12a may be set up to have a shape shorter in length than that of the outer circumferential surface of the central portion 12 along a circumferential direction of the central portion 12, and also, may not be continuously formed but may be intermittently formed depending on needs. In addition, although the protruding portion 12a has a radial end portion formed in a circular-arc cross section, such a configuration is not limitative and may take a rectangular cross section depending on needs. Moreover, the central portion 12 is not limited to the semi-cylindrical member obtained by splitting the cylindrical member into halves, and also, a circumferential circular-arc thereof may be longer or shorter in length than that of a semicylindrical member depending on needs.

With the vibration insulation damper 10, further, the first extending portion 14a extends from the central portion 12 along the axis C in a positive direction of the x-axis and the second extending portion 14b extends from the central portion 12 along the axis C in a negative direction of the x-axis. More particularly, the first extending portion 14a is a truncated semi-conical tubular member, formed by splitting a truncated conical tubular member, which has a conical outer surface with a center axis aligned on the axis C, into halves with the cutting plane cut along the direction of the axis C, in such a manner that a part of a circumferential wall portion of the truncated conical tubular member is opened to expose an internal surface thereof in the negative direction of the z-axis. The first extending portion 14a has a portion, connected to the central portion 12, which has an outer diameter equal to an outer diameter of the central portion 12, and also, the outer diameter of the first extending portion 14a decreases in the positive direction of the x-axis. Further, the first extending portion 14a has a semi-cylindrical shape in a cross section with a cutting plane cut along a radial direction of the first extending portion 14a, viz., a cutting plane parallel to the y-z plane. Furthermore, a rate of decreasing the outer diameter of the first extending portion 14a in the positive direction of the x-axis is not limited to those which are proportional, and also, such a rate of decreasing the outer diameter may be incremental or decremental depending on needs. In addition, the first extending portion 14a is not limited to the truncated semi-conical tubular member obtained by splitting the truncated conical tubular member into halves but may have a shape with a circular arc in a circumferential direction of the first extending portion 14a being longer or shorter than that of a semi-conical tubular member depending on needs.

Here, the first extending portion 14a includes a first rib 16a, a third rib 16c and a fifth rib 16e. In particular, the first rib 16a protrudes outward in the radial direction of the first extending portion 14a from the outer circumferential surface of the first extending portion 14a at a central region in a circumferential direction of the first extending portion 14a and extends along an entire length of the first extending portion 14a in the direction of the axis C. Further, the third rib 16c protrudes outward in the radial direction of the first extending portion 14a from the outer circumferential surface of the first extending portion 14a at one end in the circumferential direction of the first extending portion 14a and extends along the entire length of the first extending portion 14a in the direction of the axis C. Furthermore, the fifth rib 16e protrudes outward in the radial direction of the first extending portion 14a from the outer circumferential surface of the first extending portion 14a at the other end in the circumferential direction of the first extending portion 14a and extends along the entire length of the first extending portion 14a in the direction of the axis C.

That is, in the circumferential direction of the outer circumferential surface of the first extending portion 14a, the angle between the first rib 16a and the third rib 16c and that between the first rib 16a and the fifth rib 16e are set as 90 degrees, respectively. Moreover, the number of such ribs is not limitative and, for instance, only the first rib 16a may be selectively provided or only a pair of the third rib 16c and the fifth rib 16e may be selectively provided. In addition, other ribs may be additionally provided between the first rib 16a and the third rib 16c and between first rib 16a and the fifth rib 16e and, or other ribs may be provided only between the first rib 16a and the third rib 16c and only between the first rib 16a and the fifth rib 16e, depending on needs.

Further, end portions of the first rib 16a, the third rib 16c and the fifth rib 16e of the first extending portion 14a in the radial direction of the first extending portion 14a are located to be flush with the outer circumferential surface of the central portion 12 and fixed with constant heights over the entire length of the first extending portion 14a in the direction of the axis C. However, such end portions may be chamfered in minute circular arc shapes or the like at corner portions of the first rib 16a, the third rib 16c and the fifth rib 16e in the positive direction of the x-axis, respectively, depending on needs.

Further, widths of the first rib 16a, the third rib 16c and the fifth rib 16e, viz., the widths of the first rib 16a, the third rib 16c and the fifth rib 16e in the circumferential direction of the outer circumferential surface of the first extending portion 14a, are fixed as constant and end portions of the first rib 16a, the third rib 16c and the fifth rib 16e in the radial direction of the first extending portion 14a are formed in rectangular cross sections, respectively.

Meanwhile, the second extending portion 14b, extending from the central portion 12 in the negative direction of the x-axis, differs from the first extending portion 14a to be opposite in its extending direction and the remaining structure is identical to that of the first extending portion 14a.

More particularly, the second extending portion 14b includes a truncated semi-conical tubular member, formed by splitting a truncated conical tubular member, which has a conical outer surface with a center axis aligned on the axis C, into halves with the cutting plane cut along the direction of the axis C, in such a manner that a part of a circumferential wall portion of the truncated conical tubular member is opened to expose an internal surface thereof in the negative direction of the z-axis. The second extending portion 14b has a portion, connected to the central portion 12, which has an outer diameter equal to an outer diameter of the central portion 12, and the outer diameter of the second extending portion 14b decreases in the negative direction of the x-axis. Further, the second extending portion 14b has a semi-cylindrical shape in a cross section with a cutting plane cut along a radial direction of the second extending portion 14b, viz., a cutting plane parallel to the y-z plane.

Here, the second extending portion 14b includes a second rib 16b, a fourth rib 16d and a sixth rib 16f that protrude outward in the radial direction of the second extending portion 14b from an outer circumferential surface of the second extending portion 14b and extend along an entire length of the second extending portion 14b in the direction of the axis C, respectively. More particularly, the second rib 16b corresponds to the first rib 16a of the first extending portion 14a. Likewise, the fourth rib 16d corresponds to the third rib 16c of the first extending portion 14a, and the sixth rib 16f corresponds to the fifth rib 16e of the first extending portion 14a, respectively.

That is, in the circumferential direction of the outer circumferential surface of the second extending portion 14b, the angle between the second rib 16b and the fourth rib 16d and that between the second rib 16b and the sixth rib 16f are set as 90 degrees, respectively. Moreover, the second rib 16b, the fourth rib 16d and the sixth rib 16f have end portions in the radial direction of the second extending portion 14b, which are located to be flush with the outer circumferential surface of the central portion 12 and fixed with constant heights over the entire length of the second extending portion 14b in the direction of the axis C.

Here, the first extending portion 14a and the second extending portion 14b are symmetric in shape with respect to the central portion 12. With the first extending portion 14a and the second extending portion 14b, further, the first rib 16a and the second rib 16b, the third rib 16c and the fourth rib 16d, and the fifth rib 16e and the sixth rib 16f are symmetric in shape with respect to the central portion 12, respectively. In addition, the ribs 16a to 16f may be set up to be shorter in length than the entire lengths of the first extending portion 14a and the second extending portion 14b in the direction of the axis C, and also, may not be continuously provided but may be intermittently provided, respectively, depending on needs.

Further, the central portion 12 has an internal surface provided with a seventh rib 18. The seventh rib 18 is formed to overlap the protruding portion 12a as viewed in the radial direction of the central portion 12 and further extend in an X-shape with the resultant end portions of the seventh rib 18 reaching at the third rib 16c and the fifth rib 16e of the first extending portion 14a and the fourth rib 16d and the sixth rib 16f of the second extending portion 14b, respectively. In addition, since the seventh rib 18 may be enough if the central portion 12 or the like keep improved rigidity, the seventh rib 18 is not limited to the X-shape configuration and may be enough to have a configuration radially extending from the central portion 12 along the internal surface of the central portion 12 and the like. Moreover, these extensions of the seventh rib 18 may not be contiguous but may be intermittent, depending on needs.

By the way, the vibration insulation damper 10 of the present embodiment, formed in such a structure, is applied to a coil spring and, more particularly, fitted into an internal circumferential portion of the coil spring. Although the coil spring is of the type that is typically mounted on a pedal apparatus such as a brake pedal apparatus, etc., of a vehicle like a motor vehicle, etc., for appropriately adjusting a depressing force applied by an operator such as a driver, such an application is not limitative and an application may include a coil spring for generating a predetermined compressing force or tensile force. Hereunder, the vibration insulation damper 10 will be described below in more detail further with reference to FIGS. 5 to 7 in respect of a structure internally fitted into the coil spring.

Figure 5:
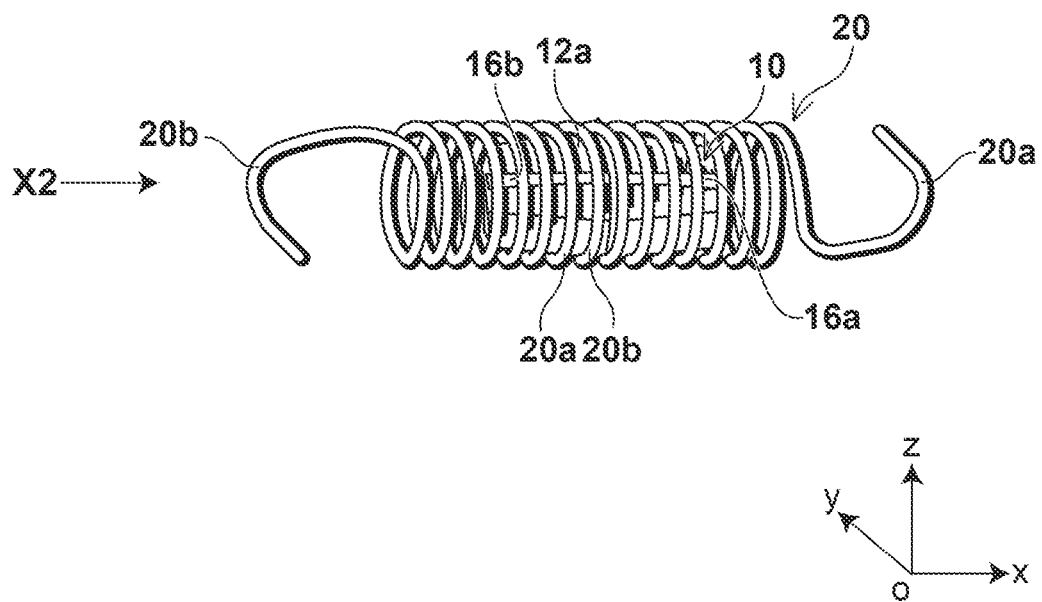
FIG. 5 is a perspective view of the vibration insulation damper of the present embodiment with a coil spring in a state under which the vibration insulation damper is inserted into the coil spring.
Figure 6:
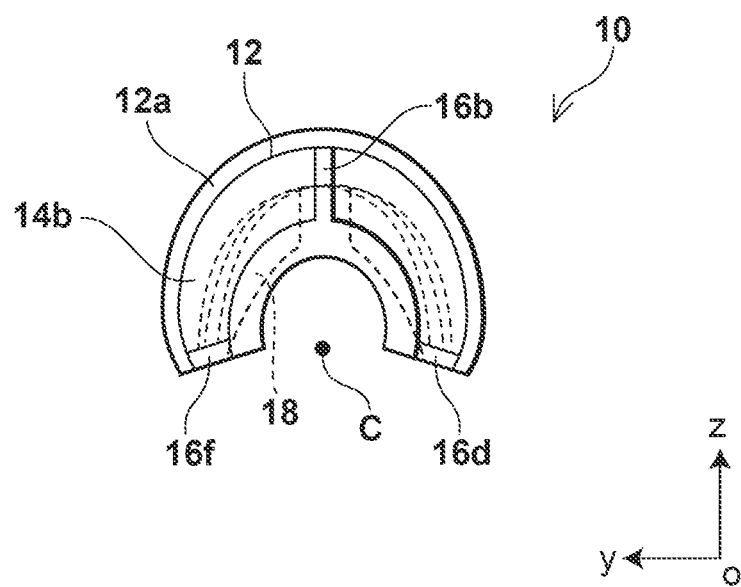
FIG. 6 is a front view of the vibration insulation damper of the present embodiment in a state under which the vibration insulation damper is inserted into the coil spring and represents the vibration insulation damper as a view taken on arrow X2 in FIG. 5.
Figure 7:
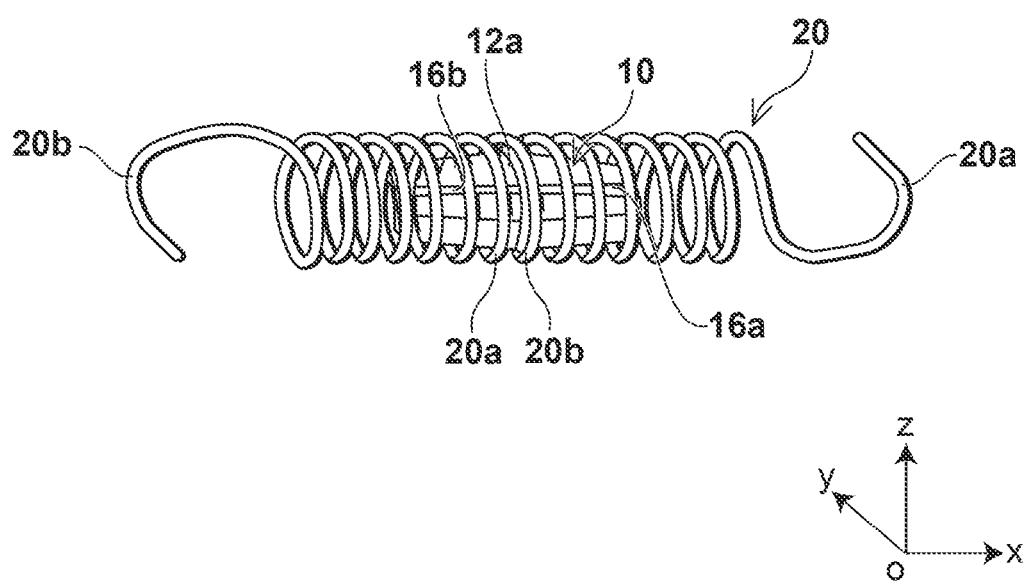
FIG. 7 is a perspective view of the vibration insulation damper of the present embodiment with a coil spring in a state under which the coil spring is stretched together with the vibration insulation damper.

FIG. 5 is a perspective view of the vibration insulation damper of the present embodiment with a coil spring in a state under which the vibration insulation damper is inserted into the coil spring. FIG. 6 is a front view of the vibration insulation damper of the present embodiment in a state under which the vibration insulation damper is inserted into the coil spring and represents the vibration insulation damper as a view taken on arrow X2 in FIG. 5. Further, FIG. 7 is a perspective view of the vibration insulation damper of the present embodiment with a coil spring in a state under which the coil spring is stretched together with the vibration insulation damper.

As shown in FIGS. 5 and 6, the vibration insulation damper 10 is inserted into the coil spring 20 along an internal circumferential portion of the coil spring 20 from a side of one end 20a or from a side of the other end 20b. In particular, the central portion 12, the first extending portion 14a and the second extending portion 14b are comprised of a split body having inner circumferential surfaces of the respective portions, and thus, grasping these portions and compressing the same results in consequence to cause these portions to be inwardly bent with the inner circumferential surfaces thereof in compressed states under which the vibration insulation damper 10 can be inserted into the internal circumferential portion of the coil spring 20.

Here, the outer diameter of the central portion 12 composed of the semi-cylindrical member, a distance between the axis C and each radial end position of the first rib 16a, the third rib 16c and the fifth rib 16e of the first extending portion 14a, respectively placed in flush with the outer circumferential surface of the central portion 12, and a distance between the axis C and each radial end position of the second rib 16b, the fourth rib 16d and the sixth rib 16f of the second extending portion 14b, respectively placed in flush with the outer circumferential surface of the central portion 12, are set up to be greater than an inner diameter of the coil spring 20 by a predetermined amount.

Thus, during insertion of the vibration insulation damper 10 into the internal circumferential portion of the coil spring 20, the vibration insulation damper 10 is inserted in such a manner that respective portions having relatively low rigidities, viz., respective upper end portions of the ribs 16a, 16c and 16e of the first extending portion 14a as the radial end portions or respective upper end portions of the ribs 16b, 16d and 16f of the second extending portion 14b as the radial end portions are brought into abutting contact with the internal circumferential portion of the coil spring 20 with resultant deformations of the ribs 16a, 16c and 16e or the ribs 16b, 16d and 16f, respectively.

After the vibration insulation damper 10 is fitted into the internal circumferential portion of the coil spring 20, further, the central portion 12, the first rib 16a, the third rib 16c and the fifth rib 16e of the first extending portion 14a and the second rib 16b, the fourth rib 16d and the sixth rib 16f of the second extending portion 14b are caused to expand in the radial direction of the vibration insulation damper 10 and brought into pressured contact with the internal circumferential portion of the coil spring 20. This applies the coil spring 20 with desired pressing forces outward in the radial direction of the vibration insulation damper 10. Simultaneously, if an excitation force is applied to the coil spring 20 under a state where the vibration insulation damper 10 is fully inserted into the coil spring 20, the vibration insulation damper 10 provides damping characteristics for damping vibrations that would occur with the coil spring 20.

When inserting the vibration insulation damper 10 into the internal circumferential portion of the coil spring 20, further, the vibration insulation damper 10 needs to penetrate the internal circumferential portion of the coil spring 20 while the vibration insulation damper 10 is grasped to induce deformation thereof with a reduction in its diameter particularly as shown in FIG. 6. However, the first extending portion 14a and the second extending portion 14b include the truncated semi-conical tubular members, respectively. Therefore, only the outer circumferential surface of the central portion 12, the radial end portions of the first rib 16a, the third rib 16c and the fifth rib 16e of the first extending portion 14a, and the radial end portions of the second rib 16b, the fourth rib 16d and the sixth rib 16f of the second extending portion 14b result in abutting contact with the internal circumferential portion of the coil spring 20. This results in reduction of contact area defined between the vibration insulation damper 10 and the coil spring 20, and thus, sliding resistance therebetween generated in case of the insertion of the vibration insulation damper 10 into the coil spring 20 can be reduced in such a manner that the insertion of the vibration insulation damper 10 into the coil spring 20 can be performed in a simple and reliable fashion.

With the vibration insulation damper 10 inserted into the coil spring 20, further, the protruding portion 12a, formed on the central portion 12, is clamped with predetermined neighboring wire segments 20a and 20b of the coil spring 20 in such a manner that the vibration insulation damper 10 is correctly positioned with respect the coil spring 20. Here, during the insertion of the vibration insulation damper 10 into the coil spring 20, the protruding portion 12a of the central portion 12 is brought into abutting contact with the internal circumferential portion of the coil spring 20. However, the protruding portion 12a per se is formed in a relatively small size and has an end portion formed in a circular arc shape with a resultant minute affect on sliding resistance during such insertion.

Next, with the vibration insulation damper 10 inserted into the coil spring 20, if the coil spring 20 is stretched as shown in FIG. 7, the coil spring 20 decreases in diameter with an increase in an interval between the wire segments thereof. Under such a state, the vibration insulation damper 10 is correspondingly reduced in diameter. This causes the outer circumferential surface of the central portion 12, the radial end portions of the first rib 16a, the third rib 16c and the fifth rib 16e of the first extending portion 14a and the radial end portions of the second rib 16b, the fourth rib 16d and the sixth rib 16f of the second extending portion 14b to be brought into abutting contact with the internal circumferential portion of the coil spring 20, enough, with the protruding portion 12a of the central portion 12 remained clamped between the neighboring wire segments 20a and 20b of the coil spring 20, while damping the vibrations occurring in the coil spring 20 with the damping characteristics of the vibration insulation damper 10.

Now, a result of applying an excitation force to the coil spring 20 with the vibration insulation damper 10 inserted into the coil spring 20, as set forth above, will be described below in more detail with further reference to FIG. 8 and FIGS. 9A and 9B.

Figure 8:
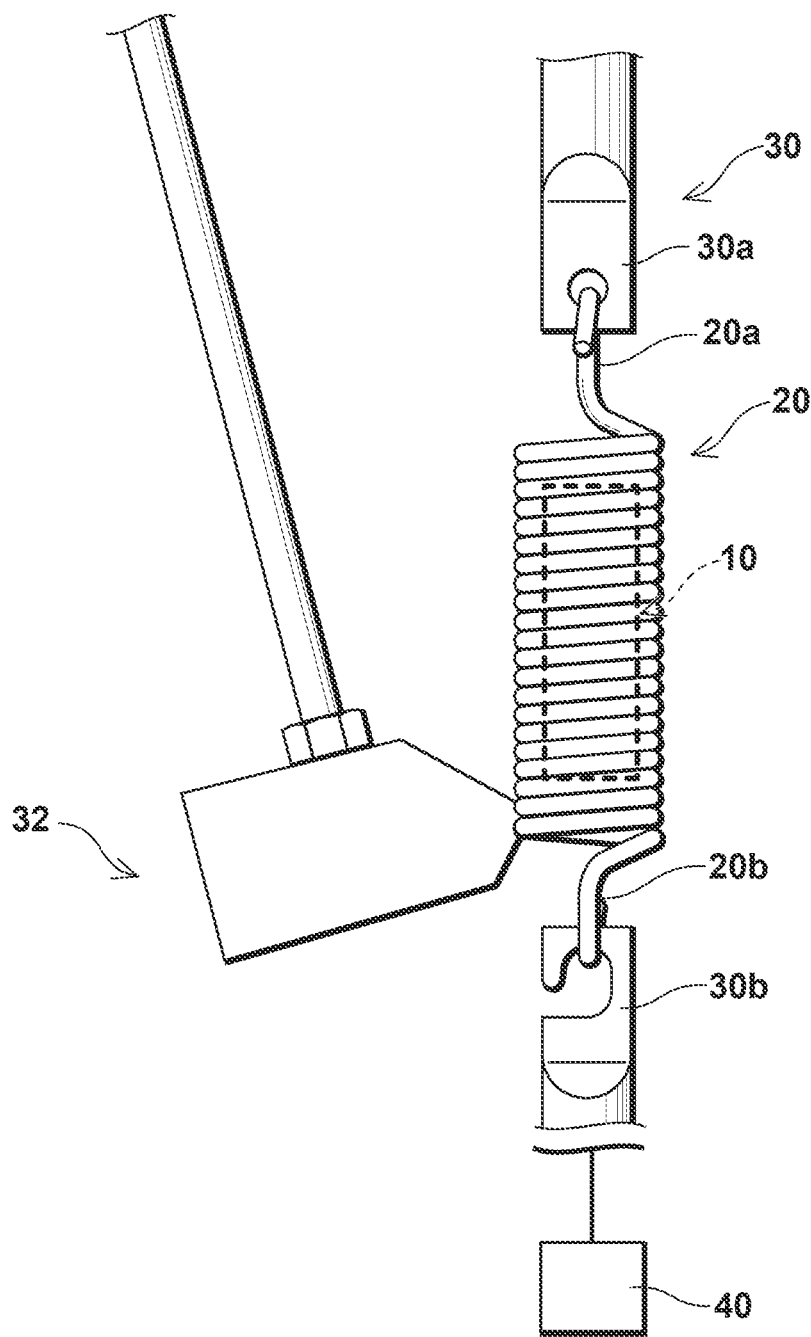
FIG. 8 is a partial side view of a measurement device for measuring anti-vibration characteristics under a state in which the vibration insulation damper of the present embodiment is inserted into the coil spring.

FIG. 8 is a partial side view of a measurement device for measuring anti-vibration characteristics under a state in which the vibration insulation damper of the present embodiment is inserted into the coil spring. FIG. 9A is a view showing a measured result obtained by the measurement device of FIG. 8 under a state in which the vibration insulation damper of the present embodiment is inserted into the coil spring. Further, FIG. 9B is a view showing a measured result obtained by the measurement device of FIG. 8 under a state in which the vibration insulation damper of the present embodiment is not inserted into the coil spring. Throughout FIGS. 9A and 9B, a vertical axis A indicates amplitude (in relative unit) and a horizontal axis t indicates time (in second).

As shown in FIG. 8, the coil spring 20, into which the vibration insulation damper 10 is inserted, is attached to the vibration measuring device 30 for the purpose of measuring anti-vibration characteristics of the vibration insulation damper 10 under a condition where the vibration insulation damper 10 is inserted into the coil spring 20. More particularly, the end portions 20a and 20b of the coil spring 20, into which the vibration insulation damper 10 is inserted, are correspondingly clamped on clamping members 30a and 30b of the vibration measuring device 30, upon which a length between the clamping members 30a and 30b is stretched, and also, an end portion of the coil spring 20 is applied with a predetermined impulsive force for only one time by using an excitation member 32. Here, a vibration, occurring in the coil spring 20, was measured by using a vibration sensor 40 via the clamping member 30b on the lower side.

Figure 9A:
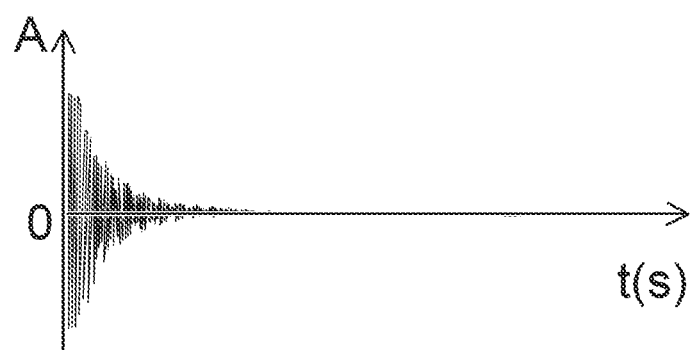
FIG. 9A is a view showing a measured result obtained by the measurement device of FIG. 8 under a state in which the vibration insulation damper of the present embodiment is inserted into the coil spring.
Figure 9B:
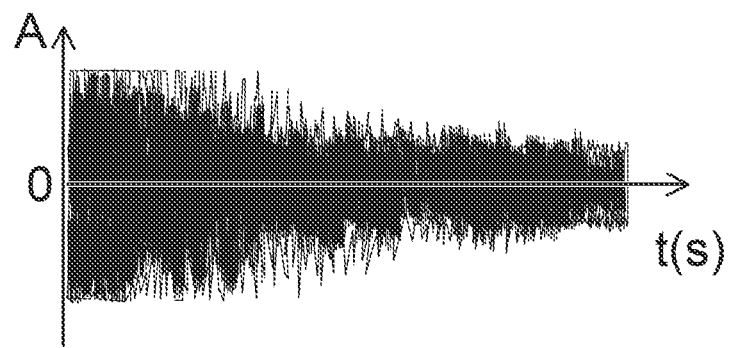
FIG. 9B is a view showing a measured result obtained by the measurement device of FIG. 8 under a state in which the vibration insulation damper of the present embodiment is not inserted into the coil spring.

Under such a state, a vibration, detected by the vibration sensor 40, exhibits an amplitude, as shown in FIG. 9A, which attenuates for a short period of time. On the contrary, when no vibration insulation damper 10 is inserted into the coil spring 20, no vibration attenuates with a long period of time as shown in FIG. 9B. Thus, it can be understood that the vibration insulation damper 10 of the present embodiment exhibits adequate damping characteristics.

Incidentally, while the present embodiment has been described above with reference to the central portion 12, composed of the semi-cylindrical member, and the first extending portion 14a and the second extending portion 14b both of which are composed of the truncated semi-conical tubular members, respectively, their splitting angles may be altered, respectively, depending on needs.

With such a structure set forth above, accordingly, the elastic body having the diameter decreasing along the axial direction is provided with the ribs that protrude outward in the radial direction from the conical outer circumferential surface of the elastic body to be brought into pressured contact with the internal circumferential portion of the coil spring when the elastic body is inserted into the internal circumferential portion of the coil spring. Thus, when the vibration insulation damper is actually inserted into the coil spring along the internal circumferential portion thereof, the vibration insulation damper can be accurately positioned to the coil spring with no occurrence of kinking or twisting motion thereof and resultantly assembled with no occurrence of its drop-off while decreasing the contact area of the vibration insulation damper with respect to the internal circumferential portion of the coil spring such that desired anti-vibration characteristics can be obtained. Further, since the contact area of the vibration insulation damper with respect to the internal circumferential portion of the coil spring can be reduced, resistance occurring during stretching and compressing of the coil spring can be reduced in this way. Thus, even if the elastic body is hardened due to a temporal change or the like, sliding noises between the coil spring and the elastic body can be suppressed. Furthermore, at the initial stage in which the vibration insulation damper is inserted into the coil spring, the vibration insulation damper is going to be press fitted from its one end, with the smaller diameter, of the elastic body, and also, the rib, formed thereon, has rigidity that can be relatively set to be low. Thus, this can causes the rib to deform and enables the reduction in insertion resistance of the vibration insulation damper with respect to the internal circumferential portion of the coil spring to allow the vibration insulation damper to be simply and surely inserted into the coil spring, thereby resulting in improved assembling capability.

Furthermore, the first extending portion and the second extending portion, forming the elastic body, are integrally connected to each other via the central portion to be symmetric with respect to the central portion while the ribs, formed on the first extending portion and the second extending portion, respectively, are symmetric with respect to the central portion. This enables similar assembly to be performed even if the vibration insulation damper is inserted into the internal circumferential portion of the coil spring at either the first extending portion or the second extending portion, thereby further improving capability of assembling the vibration insulation damper into the coil spring. In addition, the central portion is able to apply the internal circumferential portion of the coil spring with the relatively large pressing force, thereby making it possible to obtain stable anti-vibration characteristics.

With the elastic body is comprised of the split body having the inner circumferential surface, further, pressing the elastic body by grasping the same enables the elastic body to be inserted into the internal circumferential portion of the coil spring under the compressed state thereof so as to bend inward from its inner circumferential surface. This makes it easy to perform such insertion of the elastic body with resultant further improved capability of assembling the vibration insulation damper into the coil spring. Moreover, after the vibration insulation damper has been assembled into the coil spring, the elastic body can expand outward to apply the internal circumferential portion of the coil spring with the stable pressing force, thereby making it possible to obtain stable anti-vibration characteristics.

Furthermore, there is provided at least one of the central rib, extending over the entire length of the first extending portion and the second extending portion in the axial direction at the center of each outer circumferential surface of the first extending portion and the second extending portion in the circumferential direction, and the side rib extending over the entire length of the first extending portion and the second extending portion in the axial direction at the side end of each outer circumferential surface of the first extending portion and the second extending portion in the circumferential direction. This allows the ribs to apply the internal circumferential portion of the coil spring with the pressing force in the balanced manner, thereby making it possible to obtain stable anti-vibration characteristics.

Moreover, the elastic body further includes the protruding portion protruding outward in the radial direction from the outer circumferential surface of the elastic body over the entire circumferential length thereof and the protruding portion can be fitted between the wire segments of the coil spring with the elastic body being inserted into the internal circumferential portion of the coil spring. Thus, when the vibration insulation damper is actually inserted into the coil spring along the internal circumferential portion thereof, the vibration insulation damper can be accurately positioned to the coil spring with no occurrence of kinking or twisting motion thereof to be assembled with no occurrence of its drop-off such that stable anti-vibration characteristics can be obtained.

In addition, the elastic body further includes the rib protruding inward in the radial direction from the inner circumferential surface of the elastic body and radially extending along the inner circumferential surface thereof. Thus, when the vibration insulation damper is actually inserted into the coil spring along the internal circumferential portion thereof, the vibration insulation damper can be accurately positioned to the coil spring with no occurrence of kinking or twisting motion thereof with no occurrence of its drop-off such that stable anti-vibration characteristics can be obtained. Moreover, after the vibration insulation damper has been assembled into the coil spring, the elastic body can be kept under its expanded state to apply the internal circumferential portion of the coil spring with the stable pressing force, thereby making it possible to reliably obtain stable anti-vibration characteristics.

(Second Embodiment)

Next, a vibration insulation damper of a second embodiment according to the present invention is described below in detail with further reference to FIG. 10 and FIG. 11.

Figure 10:
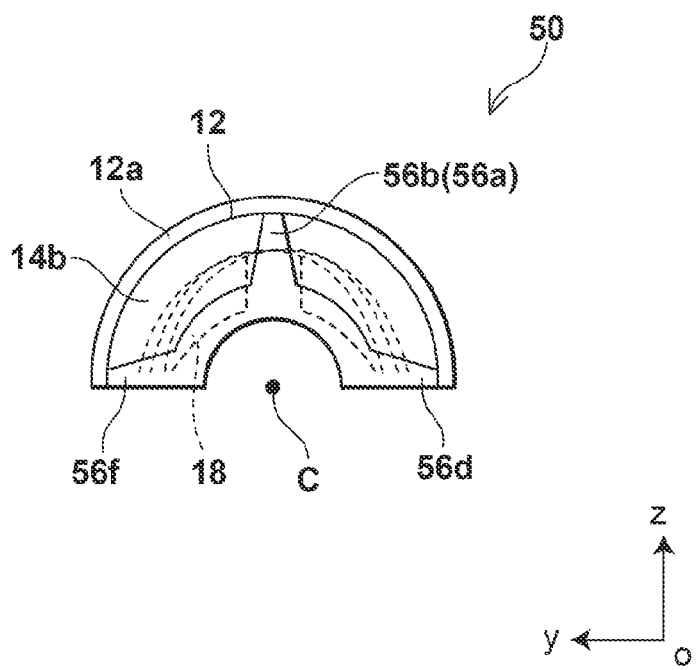
FIG. 10 is a front view of a vibration insulation damper of a second embodiment according to the present invention and corresponds to FIG. 2 in respect of a positional relationship.

FIG. 10 is a front view of the vibration insulation damper of the present embodiment and corresponds to the positional relationship shown in FIG. 2. Moreover, FIG. 11 is a bottom perspective view of the vibration insulation damper of the present embodiment and corresponds to the positional relationship shown in FIG. 4.

Figure 11:
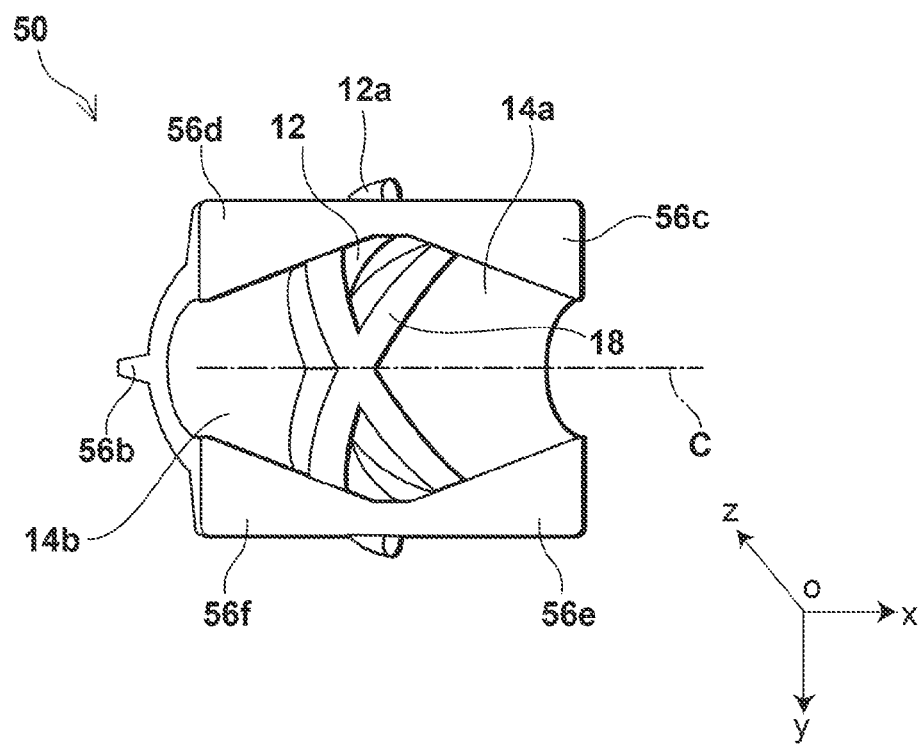
FIG. 11 is a bottom perspective view of the vibration insulation damper of the present embodiment and corresponds to FIG. 4 in respect of the positional relationship.

As shown in FIG. 10 and FIG. 11, the vibration insulation damper 50 of the present embodiment mainly differs from the vibration insulation damper 10 of the first embodiment, in that the first rib 56*a*, the third rib 56*c* and the fifth rib 56*e* of the first extending portion 14*a* and the second rib 56*b*, the fourth rib 56*d* and the sixth rib 56*f* of the second extending portion 14*b* are modified in shape, with the remaining structure remained identical. Therefore, the present embodiment will be described below with a focus on such a differing point with like component parts bearing the same reference numerals to suitably simplify or omit descriptions.

More particularly, as to the vibration insulation damper 50, the first rib 56*a*, the third rib 56*c* and the fifth rib 56*e* of the first extending portion 14*a* and the second rib 56*b*, the fourth rib 56*d* and the sixth rib 56*f* of the second extending portion 14*b* have circumferential widths decreasing toward end portions thereof correspondingly in the radial directions of the first extending portion 14*a* and the second extending portion 14*b*. That is, the ribs 56*a*, 56*b*, 56*c*, 56*d*, 56*e* and 56*f* have tapered cross sections, respectively, which are tapered toward the end portions of the ribs 56*a*, 56*b*, 56*c*, 56*d*, 56*e* and 56*f* correspondingly in the radial directions of the first extending portion 14*a* and the second extending portion 14*b*. Incidentally, such tapered shapes may be tapered with planar states toward the end portions in the radial directions or may be tapered with curved states toward the end portions in the radial directions depending on needs.

With such a structure noted above, accordingly, the width of the rib in the circumferential direction is tapered outward in the radial direction of the elastic body. This can ensure rigidity of the rib while decreasing the contact area of the elastic body with respect to the internal circumferential portion of the coil spring when the vibration insulation damper is inserted into the coil spring along the internal circumferential portion thereof, thereby further ensuring the pressing force for the internal circumferential portion of the coil spring to obtain stable anti-vibration characteristics.

(Third Embodiment)

Next, a vibration insulation damper of a third embodiment according to the present invention is described below in detail with further reference to FIG. 12 to FIG. 15.

Figure 12:
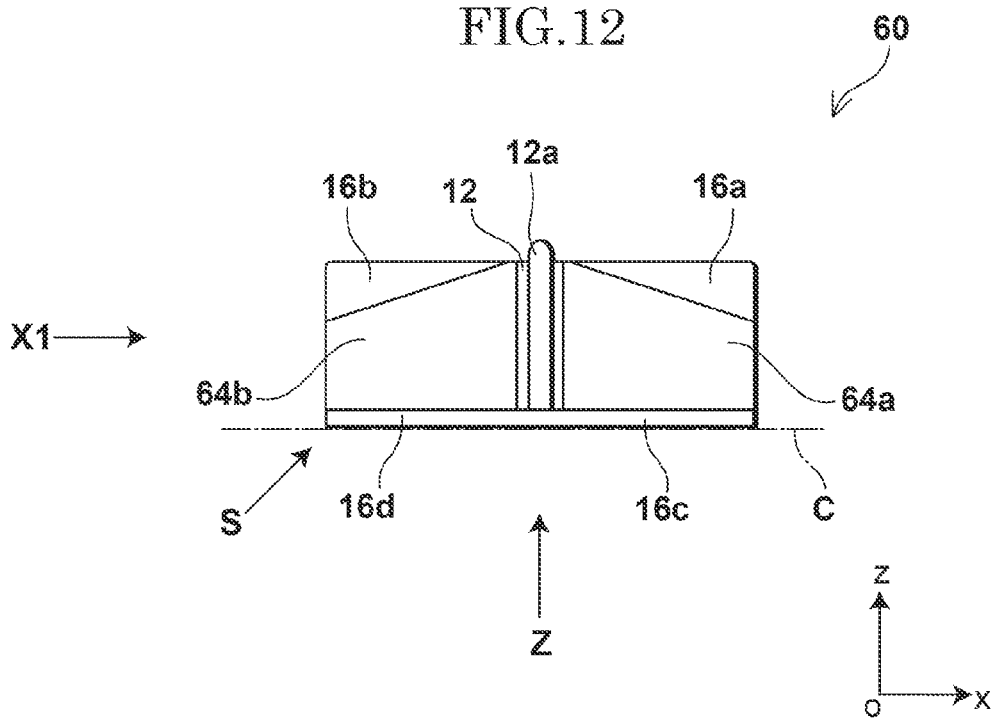
FIG. 12 is a side view of a vibration insulation damper of a third embodiment according to the present invention.
Figure 13:
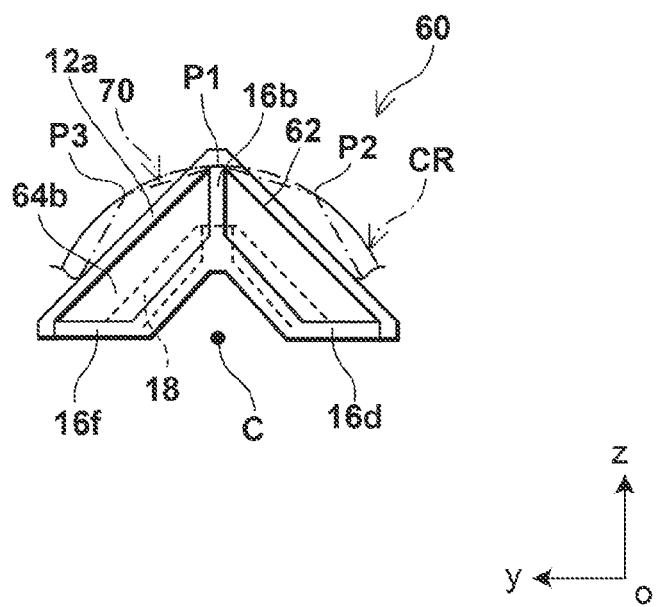
FIG. 13 is a front view of the vibration insulation damper of the present embodiment and represents a view taken on arrow X1 in FIG. 12.
Figure 14:
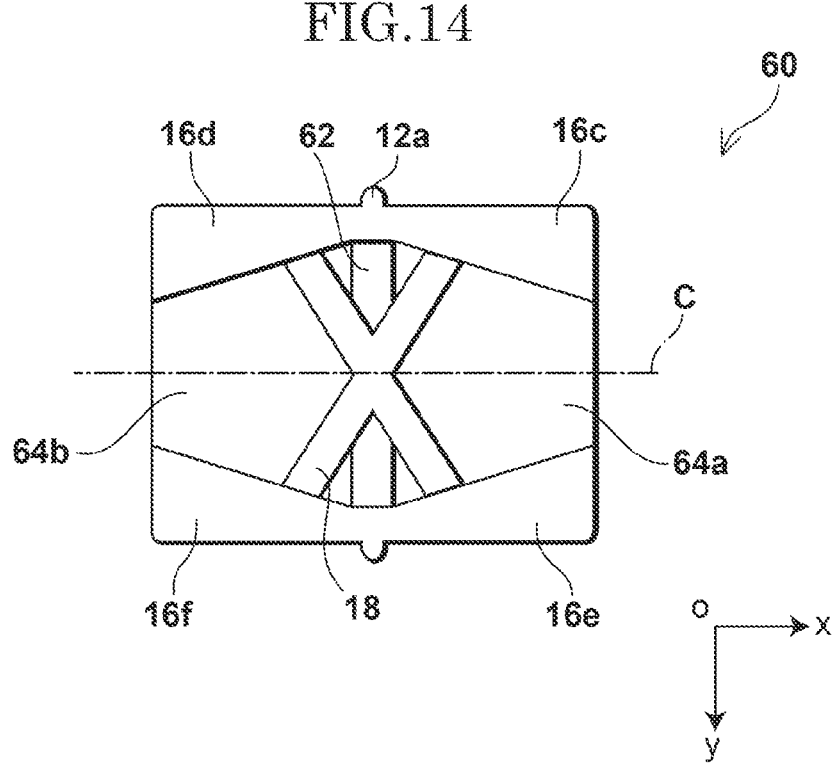
FIG. 14 is a bottom view of the vibration insulation damper of the present embodiment and represents a view taken on arrow Z in FIG. 12.
Figure 15:
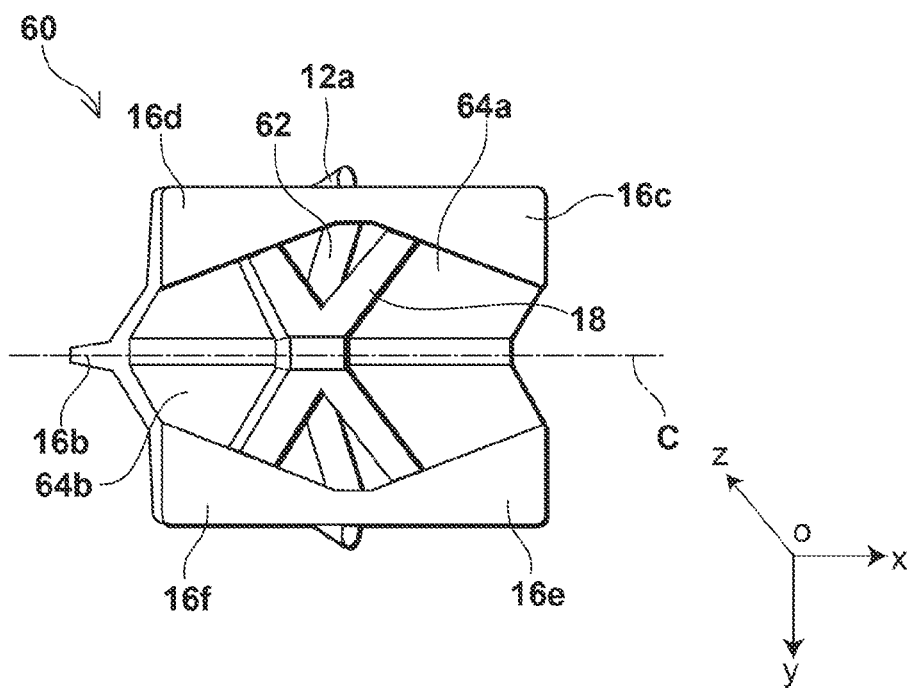
FIG. 15 is a bottom perspective view of the vibration insulation damper of the present embodiment and represents a view taken on arrow S in FIG. 12.

FIG. 12 is a side view of the vibration insulation damper of the present embodiment. FIG. 13 is a front view of the vibration insulation damper of the present embodiment and represents a view take on arrow X1 of FIG. 12. FIG. 14 is a bottom view of the vibration insulation damper of the present embodiment and represents a view take on arrow Z of FIG. 12. Further, FIG. 15 is a bottom perspective view of the vibration insulation damper of the present embodiment and represents a view take on arrow S of FIG. 12.

As shown in FIG. 12 to FIG. 15, the vibration insulation damper 60 of the present embodiment mainly differs from the vibration insulation damper 10 of the first embodiment in that the central portion 62, the first extending portion 64*a* and the second extending portion 64*b* are modified in shape and the remaining structure remained identical. Therefore, the present embodiment will be described below with a focus on such a differing point with like component parts bearing the same reference numerals to suitably simplify or omit descriptions.

More particularly, the vibration insulation damper 60 includes a central portion 62 in the form of a triangular tubular member obtained by splitting a square tubular member, which has a center axis aligned on the axis C, into halves with a cutting plane cut along the axis C, viz., a cutting plane including the axis C and parallel to the x-y plane, in such a manner that a part of a circumferential wall portion of the square tubular member is opened to expose an inner circumferential surface thereof to be partly opened in the negative direction of the z-axis. Like the first embodiment, the central portion 62 has the outer circumferential surface from which the protruding portion 12a vertically protrudes outward so as to straddle an entire circumference of the outer circumferential surface.

Further, the first extending portion 64a extends from the central portion 62 in the positive direction of the x-axis along the axis C and the second extending portion 64b extends from the central portion 62 in the negative direction of the x-axis along the axis C.

More particularly, the first extending portion 64a is a truncated triangular pyramid tubular member, formed by splitting a truncated square pyramid tubular member, which has a center axis aligned on the axis C, into halves with the cutting plane cut along the axis C, in such a manner that a part of a circumferential wall portion of the truncated square pyramid tubular member is opened to expose an inner circumferential surface thereof in the negative direction of the z-axis. Such a first extending portion 64a is connected to the central portion 62 with a vertical cross-sectional area (area in cross section parallel to the y-z plane) decreases in the positive direction of the x-axis. Here, like the first embodiment, the first extending portion 64a is provided with the first rib 16a, the third rib 16c and the fifth rib 16e.

Meanwhile, the second extending portion 64b differs from the first extending portion 64a to be opposite in a direction in which the second extending portion 64b extends with the remnant structure being identical to that of the first extending portion 64a. That is, the second extending portion 64b is a truncated triangular pyramid tubular member, formed by splitting a truncated square pyramid tubular member, which has a center axis aligned on the axis C, into halves with the cutting plane cut along the axis C, in such a manner that a part of a circumferential wall portion of the truncated square pyramid tubular member is opened to expose an inner circumferential surface thereof in the negative direction of the z-axis. Such a second extending portion 64b is connected to the central portion 62 with a vertical cross-sectional area (area in cross section parallel to the y-z plane) decreases in the negative direction of the x-axis. Here, like the first embodiment, the second extending portion 64b is provided with the second rib 16b, the fourth rib 16d and the sixth rib 16f.

Here, like the first embodiment, an apex portion of the central portion 62, an outer end portion of the first rib 16a of the first extending portion 64a and an outer end portion of the second rib 16b of the second extending portion 64b are flush with each other in the positive direction of the z-axis. One side end portion of the central portion 62, an outer end portion of the third rib 16c of the first extending portion 64a and an outer end portion of the fourth rib 16d of the second extending portion 64b are flush with each other in the negative direction of the y-axis. The other side end portion of the central portion 62, an outer end portion of the fifth rib 16e of the first extending portion 64a and an outer end portion of the sixth rib 16f of the second extending portion 64b are flush with each other in the positive direction of the y-axis. A distance between the axis C and each of the apex portion of the central portion 62, the outer end portion of the first rib 16a of the first extending portion 64a and the outer end portion of the second rib 16b of the second extending portion 64b is set up to be greater than the inner diameter of the coil spring 20 by a predetermined amount. A distance between the axis C and each of the one side end portion of the central portion 62, the outer end portion of the third rib 16c of the first extending portion 64a and the outer end portion of the fourth rib 16d of the second extending portion 64b is set up to be greater than the inner diameter of the coil spring 20 by a predetermined amount. In addition, a distance between the axis C and each of the other side end portion of the central portion 62, the outer end portion of the fifth rib 16e of the first extending portion 64a and the outer end portion of the sixth rib 16f of the second extending portion 64b is set up to be greater than the inner diameter of the coil spring 20 by a predetermined amount. Like the first embodiment, further, with the vibration insulation damper 60 remained inserted into the coil spring 20, the protruding portion 12a, provided on the central portion 62, protrudes from the central portion 62 by a predetermined amount in such a manner that the protruding portion 12a is clamped between predetermined neighboring wire segments 20a and 20b of the coil spring 20 to allow the vibration insulation damper 60 to be positioned with respect to the coil spring 20.

Like the first embodiment, furthermore, the central portion 62 has the inner circumferential surface formed with a seventh rib 18. The seventh rib 18 overlaps the protruding portion 12a, when viewed the central portion 62 in a radial direction thereof, and further extends in an X-shape with the resultant end portions of the seventh rib 18 reaching the third rib 16c and the fifth rib 16e of the first extending portion 64a and the fourth rib 16d and the sixth rib 16f of the second extending portion 64b.

With the structure of the present embodiment set forth above, the central portion 62 includes the triangular tubular member while the first extending portion 64a and the second extending portion 64b include the truncated triangular pyramid tubular members, respectively. However, such triangular shapes may have apex points P1 that can be freely moved to be brought into internal contact with a circular arc CR that is determined to have a predetermined insertion margin with respect to the internal circumferential portion of the coil spring 20. Furthermore, when there is provided a vibration insulation damper 70 that is formed in a polygonal shape, apex points P2, P3 and the like may be suitably set up to be brought into internal contact with such a circular arc CR.

Accordingly, with the structure of the present embodiment set forth above, accordingly, even if the central portion includes a triangular tubular member with the first extending portion and the second extending portion made of the truncated pyramid tubular members, rigidities of the ribs can be ensured with a reduction in contact area when the vibration insulation damper is inserted into the coil spring along the internal circumferential portion thereof, while further reliably ensuring a pressing force acting on the internal circumferential portion of the coil spring such that stable anti-vibration characteristics can be obtained.

Moreover, the present invention is not limited to the embodiments set forth above in respect of shapes, locations and the number of pieces of the members and, of course, such component elements may be suitably altered without departing from the scope of the present invention by suitably replacing the component elements with those having equivalent advantageous effects.

Industrial Applicability Of Invention

As set forth above, according to the vibration insulation damper of the present invention, it becomes possible to provide a vibration insulation damper for a coil spring which can be accurately positioned while decreasing a contact area of the vibration insulation damper with no occurrence of kinking or twisting motion thereof, when the vibration insulation damper is fitted into the coil spring along an internal circumferential portion thereof, and also assembled with no occurrence of its drop-off to provide desired anti-vibration characteristics while suppressing the occurrence of noises even if, for instance, a rubber member is hardened due to a temporal change thereof. Accordingly, such a vibration insulation damper has expectations to be widely applied to vehicular pedal apparatuses or the like because of its general-purpose and universal nature.

DESCRIPTION OF REFERENCE NUMERALS

10 .... vibration insulation damper
12 .... central portion
12a ... protruding portion
14a ... first extending portion
14b ... second extending portion
16a ... first rib
16b ... second rib
16c ... third rib
16d ... fourth rib
16e ... fifth rib
16f ... sixth rib
18 .... seventh rib
20 .... coil spring
20a ... wire segment
20b ... wire segment
30 .... vibration measurement device
30a ... clamping member
30b ... clamping member
32 .... excitation member
40 .... vibration sensor
50 .... vibration insulation damper
56a ... first rib
56b ... second rib
56c ... third rib
56d ... fourth rib
56e ... fifth rib
56f ... sixth rib
60 .... vibration insulation damper
62 .... central portion
64a ... first extending portion
64b ... second extending portion

The invention claimed is:

1. A vibration insulation damper insertable into an internal circumferential portion of a coil spring and extending in an axial direction thereof, the vibration insulation damper comprising:
an elastic body having an outer circumferential surface including at least one truncated conical or pyramid outer circumferential surface, with a portion of the at least one truncated conical or pyramid outer circumferential surface having a smallest cross-sectional shape at a first axial end of the elastic body; and
a rib protruding outward from the outer circumferential surface of the elastic body to be brought into pressured contact with the internal circumferential portion of the coil spring when the elastic body is inserted into the internal circumferential portion of the coil spring,
wherein the rib protrudes outward from the outer circumferential surface of the elastic body in a direction perpendicular to the axial direction of the elastic body, such that a distance which said rib protrudes from the outer circumferential surface increases towards the first axial end of said elastic body,
wherein the outer circumferential surface of the elastic body comprises:
a first extending portion having a first truncated conical or pyramid outer circumferential surface, with a portion of the first truncated conical or pyramid outer circumferential surface having a smallest cross-sectional shape at the first axial end of the elastic body; and
a second extending portion having a second truncated conical or pyramid outer circumferential surface, with a portion of the second truncated conical or pyramid outer circumferential surface having a smallest cross-sectional shape at a second axial end of the elastic body, the second axial end of the elastic body being opposite to the first axial end of the body,
wherein the second extending portion is integrally connected to the first extending portion via the central portion of the elastic body, and
wherein a position of an end portion of the rib in a direction perpendicular to the axial direction of the elastic body is constant over an entire length of the elastic body in the axial direction.

2. The vibration insulation damper according to claim 1, wherein the elastic body is configured to be split in the axial direction to form a split body having an inner circumferential surface.

3. The vibration insulation damper according to claim 2, wherein the rib comprises at least one of:
a central rib extending over an entire length of the first extending portion and the second extending portion in the axial direction while protruding outward from each outer circumferential surface of the first extending portion and the second extending portion in a direction perpendicular to the axial direction, at a center of each outer circumferential surface of the first extending portion and the second extending portion in a direction perpendicular to the axial direction; and
a side rib extending over an entire length of the first extending portion and the second extending portion in the axial direction while protruding outward from each outer circumferential surface of the first extending portion and the second extending portion in the direction perpendicular to the axial direction, at a side end of each outer circumferential surface of the first extending portion and the second extending portion in a direction perpendicular to the axial direction.

4. The vibration insulation damper according to claim 1, wherein a width of the rib in a direction perpendicular to the axial direction is tapered toward an outside of the elastic body.

5. The vibration insulation damper according to claim 1, wherein the elastic body is further provided with a protruding portion protruding outward from the outer circumferential surface of the elastic body over an entire circumference of the outer circumferential surface, such that the protruding portion is be fitted between wire segments of the coil spring with the elastic body being inserted into the internal circumferential portion of the coil spring.

6. The vibration insulation damper according to claim 1, wherein the elastic body is further provided with a rib protruding inward from an inner circumferential surface of the elastic body and radially extending in the inner circumferential surface.

\* \* \* \* \*